Patented Dec. 22, 1942

2,306,356

UNITED STATES PATENT OFFICE 2,306,356

MANUFACTURE OF OPAQUING AGENTS

Carl J. Harbert, Shaker Heights, and Lester A. Bateman, East Cleveland, Ohio, assignors to The Harshaw Chemical Company, Elyria, Ohio, a corporation of Ohio No Drawing. Application September 16, 1940, Serial No. 356,978

6 Claims. (Cl. 106—312)

This invention relates to the production of opaquing agents for vitreous enamels and particularly to a method suitable for production of mill additions suitable as substitutes for tin oxide.

In U. S. Patent No. 2,199,794 to Harshaw and Stillwell, there is described a class of opaquing agents containing oxides of calcium, antimony and titanium, together with suitable fluorides, and calcination products thereof. In U. S. Patent No. 2,033,707 to Harshaw and Stillwall, similar compositions were described however not including fluorides. In these patents, it is indicated as desirable when using $Sb_2O_3$ to include nitric acid in the batch as an oxidizing agent or to employ calcium nitrate as a source of calcium, the nitrate radical serving as an oxidizing agent.

We have now discovered that by using a mixture of $Ca(OH)_2$ and $CaCO_3$ as the source of calcium, we are able to dispense with the use of an oxidizing agent in the batch and rely entirely upon an oxidizing atmosphere to effect oxidation. We are thus enabled to avoid the use of the expensive nitric acid or nitrate and at the same time secure a batch which mixes more readily and thoroughly and is free from any tendency to stick to the mixing equipment. It may be that intermediate reactions proceed in a somewhat different order. Of this we are not sure. In any event, the final product is finer and whiter than when nitrates are used.

Suitable proportions of $Ca(OH)_2$ and $CaCO_3$ are such that $Ca(OH)_2$ is from 10% to 50% of the combined weight of $Ca(OH)_2$ and $CaCO_3$.

Following otherwise the procedure outlined in the above noted patents we may make use of $Sb_2O_3$, $TiO_2$, $Ca(OH)_2$ and $CaCO_3$ as raw materials and optionally may include calcium fluoride. These may be employed in proportion to yield, on a calculated basis, one mol $Sb_2O_5$, approximately three mols (e. g., 2.75 to 3.25 mols) $TiO_2$ and two to three mols $CaO$. Preferably we also include $CaF_2$ in proportion to yield, on a calculated basis, 5% to 30% of the final composition. We do not know the final state of combination of these materials and accordingly refer to the final product as "containing" the constituent oxides and fluoride.

Following are suitable batch compositions:

*Example I*

| | Parts by weight |
|---|---|
| $Sb_2O_3$ | 583 |
| $TiO_2$ | 482 |
| $CaCO_3$ | 346 |
| $Ca(OH)_2$ | 115 |
| $CaF_2$ | 295 |

*Example II*

| | Parts by weight |
|---|---|
| $Sb_2O_3$ | 583 |
| $TiO_2$ | 482 |
| $CaCO_3$ | 446 |
| $Ca(OH)_2$ | 115 |

This batch, although productive of a valuable composition, is not as good as the batch of Example I.

Calcination is carried out at a temperature preferably from 1000° C. to 1200° C., batch temperature, in an oxidizing atmosphere. The time required varies according to the temperature and other conditions, particularly the size of the batch, larger batches requiring longer time. The reflectance is nearly fully developed by 1½ hours firing at 1150° C., whereas three or more hours are required at 1000° C. While other conditions may be used successfully, we prefer to fire for three hours or longer at from 1000° C. to 1150° C. or 2 hours or longer at 1100° C. to 1200° C.

The above described compositions are suitable for use as mill additions and preferably are incorporated into enamel slips at 2% to 10% and usually at 4% to 6% at the mill.

Having thus described our invention, what we claim is:

1. A process of preparing an opaquing agent for vitreous enamels comprising heating in an oxidizing atmosphere a batch containing in approximately the indicated proportions the following:

| | Molecular weights |
|---|---|
| $Sb_2O_3$ | 1 |
| $TiO_2$ | 2.75 to 3.25 |
| $Ca(OH)_2$ 10% to 50% | To yield $CaO$ 2 to 3 |
| $CaCO_3$ 50% to 90% | |

2. A process as defined in claim 1 wherein the batch also contains $CaF_2$ in an amount equal to from 5% to 30% of the weight of the final calcination product.

3. A process of preparing an opaquing agent for vitreous enamels comprising heating in an oxidizing atmosphere a batch containing approximately:

| | Parts by weight |
|---|---|
| $Sb_2O_3$ | 583 |
| $TiO_2$ | 482 |
| $CaCO_3$ | 346 |
| $Ca(OH)_2$ | 115 |
| $CaF_2$ | 295 |

4. A process of preparing an opaquing agent for vitreous enamels comprising heating in an oxidizing atmosphere a batch containing approximately:

| | Parts by weight |
|---|---|
| $Sb_2O_3$ | 583 |
| $TiO_2$ | 482 |
| $CaCO_3$ | 446 |
| $Ca(OH)_2$ | 115 |

5. A process of preparing an opaquing agent for vitreous enamels comprising heating in an oxidizing atmosphere at from 1000° C. to 1200° C. for a time sufficient to develop the pigment a batch containing in approximately the indicated proportions the following:

| | Molecular weights |
|---|---|
| $Sb_2O_3$ | 1 |
| $TiO_2$ | 2.75 to 3.25 |
| $Ca(OH)_2$ 10% to 50% <br> $CaCO_3$ 90% to 50% | To yield CaO 2 to 3 |

6. A process as defined in claim 5 wherein there is also included in the batch $CaF_2$ in amount equal to from 5% to 30% of the weight of the final calcination product.

CARL J. HARBERT.
LESTER A. BATEMAN.